(12) United States Patent
Dingli

(10) Patent No.: US 11,325,523 B2
(45) Date of Patent: May 10, 2022

(54) LIGHTING ELEMENT CONTROL FOR AN AUTONOMOUS VEHICLE

(71) Applicant: Pony.ai, Inc., Fremont, CA (US)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 185 days.

(21) Appl. No.: 16/372,886

(22) Filed: Apr. 2, 2019

(65) Prior Publication Data
US 2020/0317113 A1 Oct. 8, 2020

(51) Int. Cl.
*B60Q 1/08* (2006.01)
*B60Q 1/00* (2006.01)

(52) U.S. Cl.
CPC ........... *B60Q 1/085* (2013.01); *B60Q 1/0023* (2013.01)

(58) Field of Classification Search
None
See application file for complete search history.

(56) References Cited

U.S. PATENT DOCUMENTS

| | | | | |
|---|---|---|---|---|
| 6,587,573 B1 * | 7/2003 | Stam | ...................... | B60Q 1/085 340/930 |
| 9,694,737 B2 * | 7/2017 | Chambers | ............... | B60Q 1/085 |
| 9,818,299 B1 * | 11/2017 | Jammoussi | ........... | B60W 30/18 |
| 9,873,372 B2 * | 1/2018 | Son | ......................... | B60Q 1/085 |
| 10,059,250 B2 | 5/2018 | Lisseman et al. | | |
| 10,124,716 B1 * | 11/2018 | Gauthier | ................ | B60Q 1/143 |
| 10,179,541 B2 | 1/2019 | Lisseman et al. | | |
| 10,241,207 B2 * | 3/2019 | Rosenzweig | ...... | G02B 26/0858 |
| 10,336,244 B2 * | 7/2019 | Neumann | .............. | F21S 41/141 |
| 2008/0084286 A1 * | 4/2008 | Teramura | ................ | B60Q 1/085 340/438 |
| 2010/0213847 A1 * | 8/2010 | Biondo | ................... | B60Q 1/085 315/82 |
| 2014/0246975 A1 * | 9/2014 | Futamura | ............. | B60Q 1/0023 315/82 |
| 2015/0367854 A1 * | 12/2015 | Ezoe | ............... | B60W 30/18163 701/1 |
| 2016/0343254 A1 * | 11/2016 | Rovik | ................... | G01J 1/0488 |
| 2017/0120804 A1 * | 5/2017 | Kentley | ................ | B60W 30/08 |
| 2017/0203682 A1 * | 7/2017 | Atsmon | ................. | B60Q 1/085 |
| 2017/0217430 A1 * | 8/2017 | Sherony | ................. | B60Q 9/008 |
| 2018/0126907 A1 * | 5/2018 | Jeromin | .................... | B60R 1/00 |

(Continued)

*Primary Examiner* — James J Lee
*Assistant Examiner* — Tawri M Matsushige
(74) *Attorney, Agent, or Firm* — Sheppard Mullin Richter & Hampton LLP

(57) ABSTRACT

Systems, methods, and non-transitory computer-readable media are provided for predetermining adjustment objects and modifying vehicle lighting unit(s) accordingly. A vehicle lighting system can comprise an imaging device configured to image the surroundings of a vehicle and a data communications device configured to obtain vehicle route data. A controller element can be configured to predetermine presence of an adjustment object based on route data and imaging data. The system is configured to set the beam mode of at least one vehicle lighting unit based on the predetermination. A method can comprise the steps of (a) obtaining vehicle route data, (b) obtaining vehicle surroundings image data, (c) predetermining the occurrence of an adjustment object based on the route data and imaging data and (d) setting the vehicle beam mode based on the predetermination.

11 Claims, 13 Drawing Sheets

(56) References Cited

U.S. PATENT DOCUMENTS

| | | | |
|---|---|---|---|
| 2018/0180242 A1* | 6/2018 | Na | B60Q 1/08 |
| 2018/0208111 A1 | 7/2018 | Lisseman et al. | |
| 2018/0336787 A1* | 11/2018 | Ohnishi | G08G 1/167 |
| 2018/0365999 A1* | 12/2018 | Wiklinska | G08G 1/164 |
| 2019/0176684 A1* | 6/2019 | Zych | G06K 9/00805 |
| 2019/0283740 A1* | 9/2019 | Toda | B60W 30/09 |

* cited by examiner

LIGHTING ELEMENT CONTROL FOR AN AUTONOMOUS VEHICLE

FIELD OF THE INVENTION

This disclosure relates to control of vehicle lights. More particularly, it relates to systems techniques for predeterminate modification of headlight beam modes based on data sources.

BACKGROUND

Modern vehicles may rely on information acquired from various sensors or sensor systems onboard the vehicles to make certain specific adjustments such as lane changes, acceleration, deceleration or to simply to provide audio/visual warnings. The use of high beam headlights must be carefully managed to avoid dazzling preceding and oncoming vehicles. To make things more challenging, vehicles may occasionally disappear from sight as they pass behind other objects (e.g., buildings, bridge supports) only to appear again a moment later. Vision based sensor (imaging devices, cameras, etc.) systems in conjunction with other data sources may be used to control headlights to improve lighting conditions and safety.

SUMMARY

Human drivers are very good at placing the observed objects such as other vehicles into context when determining whether high or low beam should be used. For instance, a predetermination of where a preceding or approaching vehicle is headed in the context of the host vehicle position, direction and planned route, can be used to determine if the vehicle will be affected by the host vehicle high beam lights. Systems and methods capable of performing this type of operation may advantageously provide safety for the driver of an observed vehicle who may be dazzled by the host vehicle headlights. Also, advantageously, the predeterminate lighting adjustment features may provide better vision for the host vehicle avoiding compromising situations and potential accidents as further described below. To that end, exemplary embodiments of the present disclosure include systems, methods, and non-transitory computer readable media for predetermining adjustment objects and modifying vehicle lighting unit(s) accordingly. For instance, in an exemplary embodiment, a vehicle lighting system comprises an imaging device configured to capture an image of the surroundings of a vehicle and a data communications device configured to obtain vehicle route data. A controller element can be configured to predetermine presence of an adjustment object based on route data and imaging data. The system is configured to set the beam mode of at least one vehicle lighting unit based on the predetermination.

Similarly, a method according an exemplary embodiment comprises the steps of (a) obtaining vehicle route data, (b) obtaining vehicle surroundings image data, and (c) predetermining the occurrence of an adjustment object based on the route data and imaging data. Next, at least one lighting unit of the vehicle may be modified to an adjusted beam mode. In one exemplary embodiment, a non-transitory computer readable medium comprises instructions that, when executed, cause one or more processors to perform (a) setting at least one lighting unit at a driver preferred beam mode, (b) obtaining vehicle route data, (c) obtaining vehicle surroundings image data, (d) predetermining occurrence of an adjustment object based on route data and imaging data and (e) modifying the at least one lighting unit setting to an adjusted beam mode.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a vehicle lighting system including: an imaging device configured to capture an image of a surrounding of a vehicle, a data communications device configured to obtain vehicle route data, a controller element configured to predetermine a presence of an adjustment object based on the vehicle route data and the image, and where the system is configured to set a beam mode of a lighting unit of the vehicle based on the predetermination. Other embodiments of this aspect include corresponding computer systems, apparatus, and computer programs recorded on one or more computer storage devices, each configured to perform the actions of the methods.

Implementations may include one or more of the following features. The system where said the lighting unit includes a plurality of lighting elements. The system where the imaging device includes a camera. The system where the imaging device includes a radar. The system where the imaging device includes a lidar. The system where the data communications device includes a satellite signal receiver. The system where communications device includes a GNSS (Global Navigation Satellite System) communication element, such as a GNSS unit. The system where the controller element is configured to predetermine the presence of an adjustment object based on GNSS data. The system where predetermination of presence of an adjustment object includes a probability of the adjustment object appearing a certain distance from the vehicle within a certain time interval. The system where the adjustment object includes a vehicle or an individual equipped with a GNSS device. The system where the adjustment object includes street lighting. The system where the beam mode is adjusted from a driver preferred beam mode to an adjusted beam mode. The system where the adjusted beam mode includes high beam, low beam, wide beam and narrow beam modes. Implementations of the described techniques may include hardware, a method or process, or computer software on a computer-accessible medium.

One general aspect includes a method of operating a vehicle lighting unit including: obtaining vehicle route data, obtaining vehicle surroundings image data, predetermining occurrence of an adjustment object based on route data and imaging data, and modifying the lighting unit setting to an adjusted beam mode. Other embodiments of this aspect include corresponding computer systems, apparatus, and computer programs recorded on one or more computer storage devices, each configured to perform the actions of the methods.

Implementations may include one or more of the following features. The method further including setting at least one lighting unit at a driver preferred beam mode. The method including predetermining occurrence of an adjustment object based on GNSS data. The method including predetermining presence of an adjustment object based on probability of the adjustment object appearing a certain distance from the vehicle within a certain time interval. The method including predetermining the presence of an adjustment object based on comparison of the vehicle route data and vehicle surroundings image data. The method where the lighting unit includes a plurality of lighting elements. The method including arranging the lighting elements that is operational to produce one of high beam, low beam, wide beam and narrow beam modes. Implementations of the described techniques may include hardware, a method or process, or computer software on a computer-accessible medium.

One general aspect includes a non-transitory computer readable medium including instructions that, when executed, cause one or more processors to perform: setting at least one lighting unit at a driver preferred beam mode; obtaining vehicle route data; obtaining vehicle surroundings image data; predetermining occurrence of an adjustment object based on route data and imaging data; and modifying the at least one lighting unit setting to an adjusted beam mode. Other embodiments of this aspect include corresponding computer systems, apparatus, and computer programs recorded on one or more computer storage devices, each configured to perform the actions of the methods.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
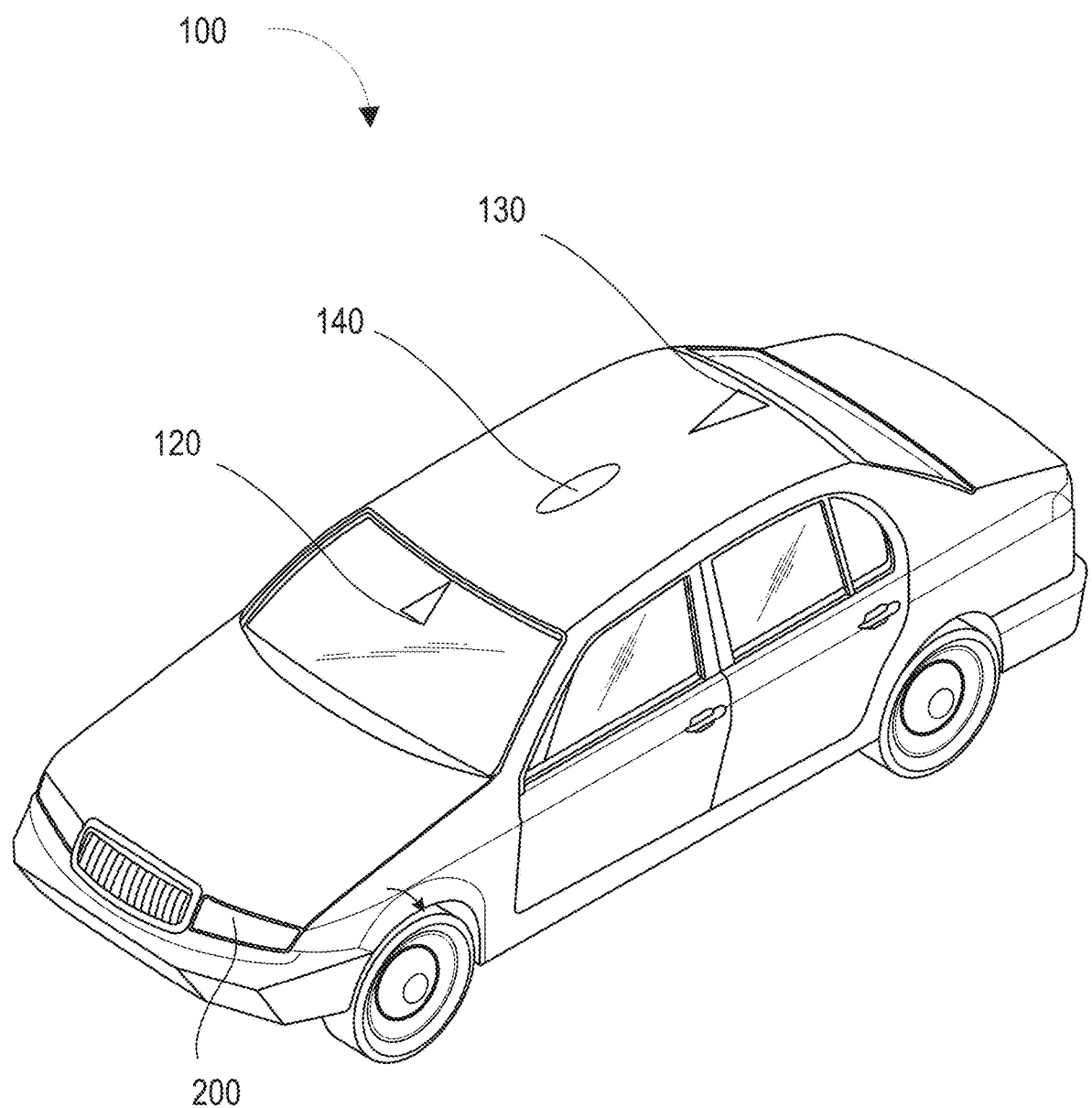
FIG. 1 illustrates a vehicle with automatically adjusting headlights according to an exemplary embodiment.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Within the context of the exemplary embodiments, a system can comprise one or more computers configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. In an exemplary embodiment a vehicle can comprise a system which based on various data sources predetermines the presence of an adjustment object and modifies one or more lighting units. An exemplary source of data may be vehicle route data which may be collected during or prior to transit and stored locally or remotely. The route data can include any data relating to the driver, vehicle and the surroundings such as maps, traffic, navigation, GNSS location, updated road conditions, weather, as well as driver-specific habits. Moreover, the route data may be updated with or used in combination with machine learning algorithm to improve the predetermining functions of the system, particularly as it pertains to adjustment objects as further described below. Essentially any data communications device suitable for obtaining the aforementioned vehicle route data is contemplated herein. In an exemplary embodiment, the vehicle is equipped with a GNSS device.

In various embodiments, an autonomous vehicle system may detect, track and predict the future estimated position and motion of other vehicles relative to the estimate location of a host autonomous vehicle based on time. Upon detecting, tracking and predicting the estimated positions of the host and other vehicles the lighting system of the host vehicle may determine the need to reduce the high beam light to avoid blinding the other vehicle's occupants.

In exemplary embodiments, the vehicle route data device is configured to communicate with a remote data source such as a satellite, a server or another vehicle (e.g. equipped with GNSS device or location identifying feature) directly. Accordingly, a vehicle may communicate data such as location coordinates and other route information with each other. This can enable the vehicles equipped with the systems described herein, to predetermine encounter with other vehicles and adjust the lighting unit accordingly. Various different GNSS (Global Navigation Satellite Systems) can be used, depending on the location and unit installed in the vehicle. Non-limiting examples include Russian GLONASS, European Galileo and Chinese Beidou.

The vehicle route data device may also interact with non-vehicle entities such as humans, buildings and other objects which are similarly equipped with a route information. This aspect is also further explained below.

The systems of exemplary embodiments may also rely on imaging devices to detect objects in the area surrounding the vehicle. Furthermore, the systems of exemplary embodiments may also rely on Radar or LiDAR data to detect the vehicle surroundings and collect data. This data in combination with the arrive at a predetermination of an adjustment object. Implementations may include one or more of the following features. For instance, implementations of the described techniques may include hardware, a method or process, or computer software on a computer-accessible medium.

The systems of the exemplary embodiments leverage data from various sources to enhance the predeterminate methodology. Sources of data may be detection systems, imaging devices, sensors, stored data, machine learning or a combination thereof. For instance, FIG. 1 illustrates a host vehicle 100 equipped with a system for predetermining presence of adjustment object(s) and setting the beam mode of the lighting units 200 based on the predetermination. The imaging device 120 is configured to capture an image of the surroundings of the host vehicle 100. As shown, the system comprises an antenna 130 for receiving route data such as map data and location information of the host vehicle 100 as well as that of other vehicles and objects for which location information is available. One or more imaging devices 120 and 140 may be incorporated into the system as well for obtaining other types of data. In particular, the imaging device may be a camera 120, a LiDAR/Radar device 140 or any such similar devices. The imaging device may be coupled with recognition software and a feedback loop to focus on objects of interest.

Figure 2A:
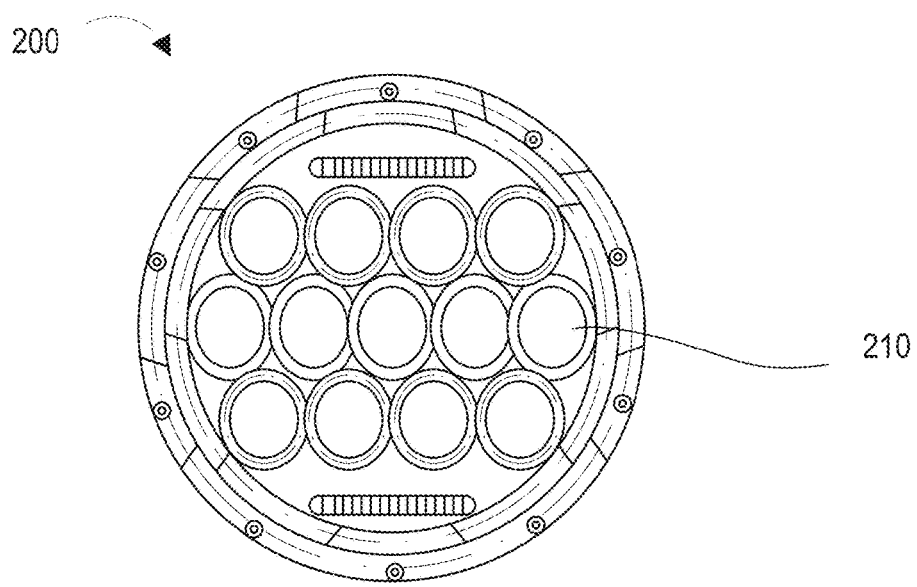
FIGS. 2A-2C illustrate automatically adjusting lighting units according to exemplary embodiments.
Figure 2B:
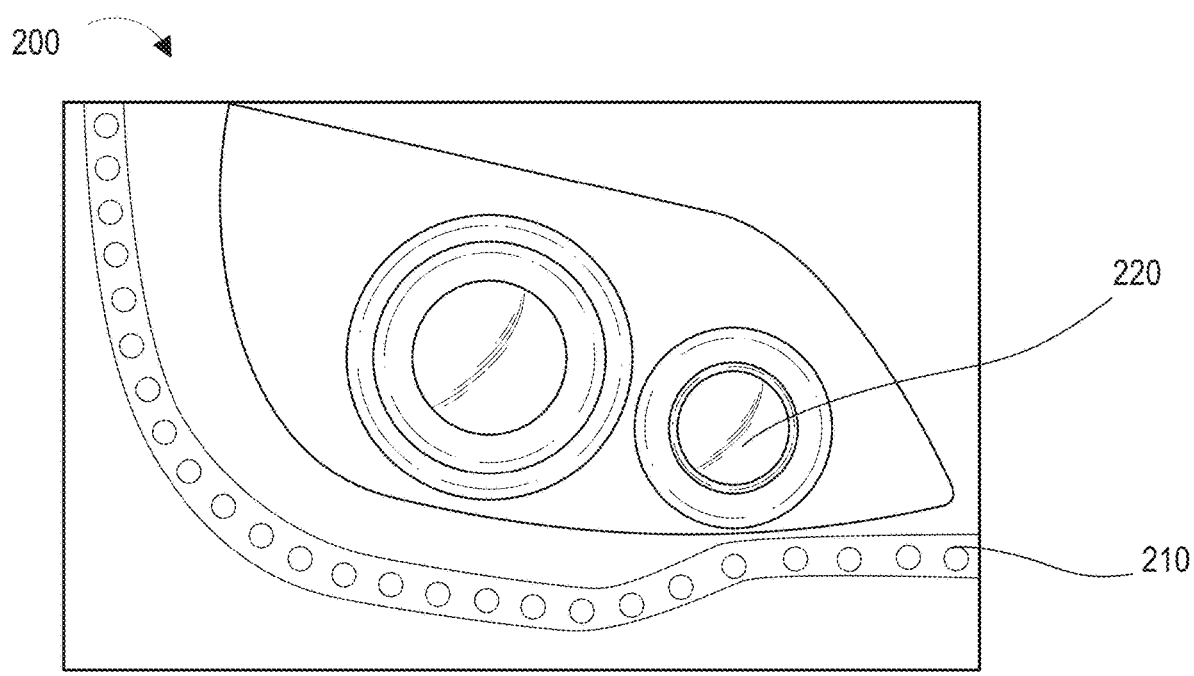
Figure 2C:
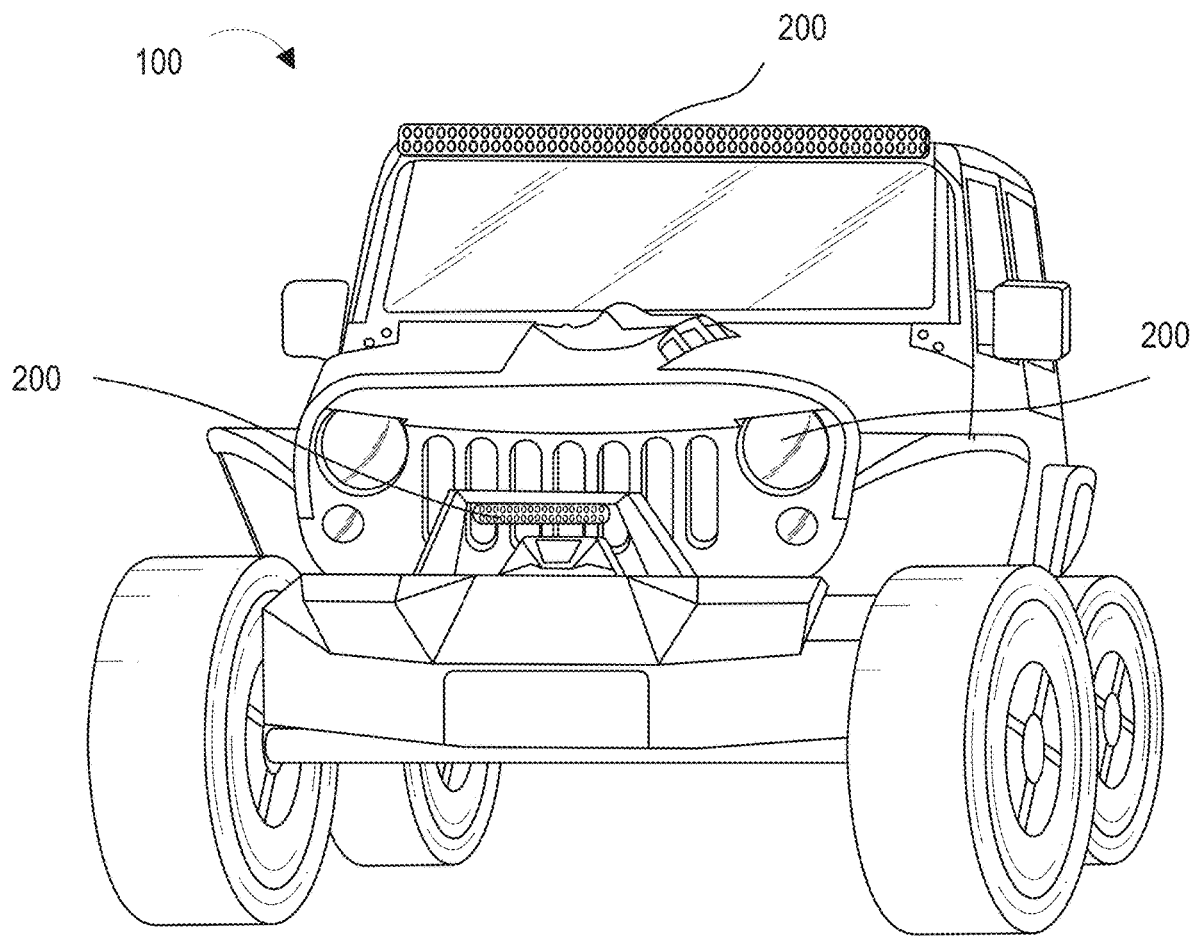

The data obtained or stored on the system may be used to predict one or more adjustment objects. As used herein, "adjustment object" is any object, including but not limited to vehicles, humans and animals, for which the system adjusts at least one lighting unit. Moreover, in the context of the present embodiments, "vehicle" denotes any object used for transporting people or goods, including cars, trucks, motorcycles and other motorized vehicles. In particular, the disclosed systems are contemplated for autonomous, semi-autonomous and human-operated vehicles. Furthermore, "lighting unit" and "lighting units" generally refer to any source of lighting for a vehicle including incandescent, LED and halogen type light sources. Each lighting unit may comprise one or more lighting elements in essentially any arrangement beneficial for producing different beam modes as further explained in this disclosure. For instance, FIG. 2A illustrates two lighting units 200 each comprising an array of lighting elements 210. In an exemplary variation of the lighting unit 200, the array of lighting elements 210 may be combined with traditional headlamps 220 as shown in FIG. 2B. Moreover, the lighting unit may be located at different portions of the vehicle as deemed advantageous. For example, the lighting units 200 shown in FIG. 2C are located both above the windshield as well as the front of the host vehicle 100.

The lighting units may comprise a plurality of lighting elements which are arranged to produce the desirable lighting effects. This advantageously provides a variety of beam modes and allows the system to further tailor the lighting based on the adjustment object. For instance, shining high beam lights into an oncoming driver's eyes may be avoided. Moreover, in exemplary embodiments, the lighting unit may also be modified to improve the host vehicle driver's vision. For instance, the outer portion of the array of lighting elements may be turned on to improve visibility of the objects to the side of the vehicle. Advantageously, a driver (or an autonomous vehicle) may be able to better identify, for example persons entering a cross walk or animals crossing the street.

Figure 8:
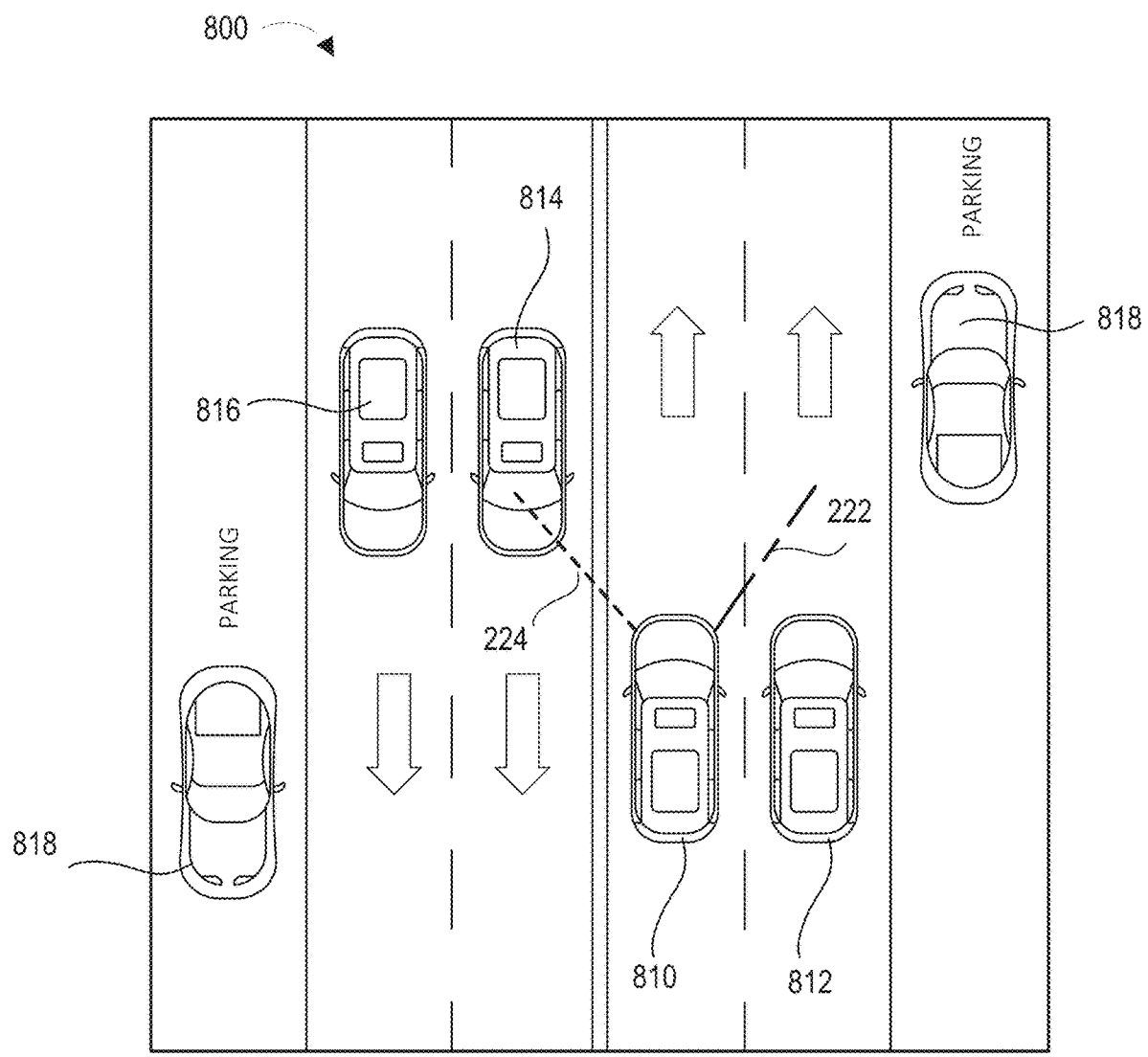
FIG. 8 illustrates vehicles in the context of one or more adjustment objects according to an exemplary embodiment.

In an exemplary embodiment, different portions of the lighting element array may be turned on and off to switch between beam modes such as a driver preferred beam mode (e.g. high beams) and adjusted beam mode (e.g. low beams). For instance, the entire array may be lit to provide a high beam mode. Then, upon predetermining an adjustment object such as an oncoming vehicle, the top half of the array may be turned off to shift to low beam mode thereby reducing negative effects on opposing driver's vision. This is exemplified in the roadway context 800 provided in FIG. 8, showing opposing traffic flow with vehicles in the left lane, vehicles in the right lane and parked vehicles. Based on the vehicle route data, imaging data or both, the vehicles will be able to adjust the beam mode based on whether the system predetermines the will be an adjustment object along the route. For instance, the system of a host vehicle 810/812 predetermines oncoming vehicles 816 and 814 (adjustment objects) appearing at a certain distance from the vehicle(s) 810/812 at a certain time. Before arrival of the oncoming vehicle(s) at the predetermined spot, the system may shift the beam mode of vehicle(s) 812/814 from a driver preferred beam mode such as high beams 222 to an adjusted beam mode, such as low beams 224, to avoid dazzling the driver in the oncoming vehicles 814 or 816. In particular, one or more of the of the headlight (or other vehicle light source) beams may be modified based on the relative position between the host vehicle(s) 810/812 and the other vehicle(s) 814/816. In the example shown, the beam mode of the left headlight is modified from a high beam 222 to a low beam 224 mode, while the right headlight remains in high beam 222 mode. This level of intelligent beam adjustment avoids the effect of high beam on another driver while maintaining illumination of the roadway for the host vehicle. Moreover, the adjusted beam mode may be different for vehicles 814 and 816 given the system capability to fine tune the lighting arrangement of the lighting units. Similarly, the host vehicle(s) 810/812 system may switch from a narrow beam mode to a wide-angle beam mode to improve host vehicle driver's vision of adjustment objects such as parked vehicles 818.

Figure 9:
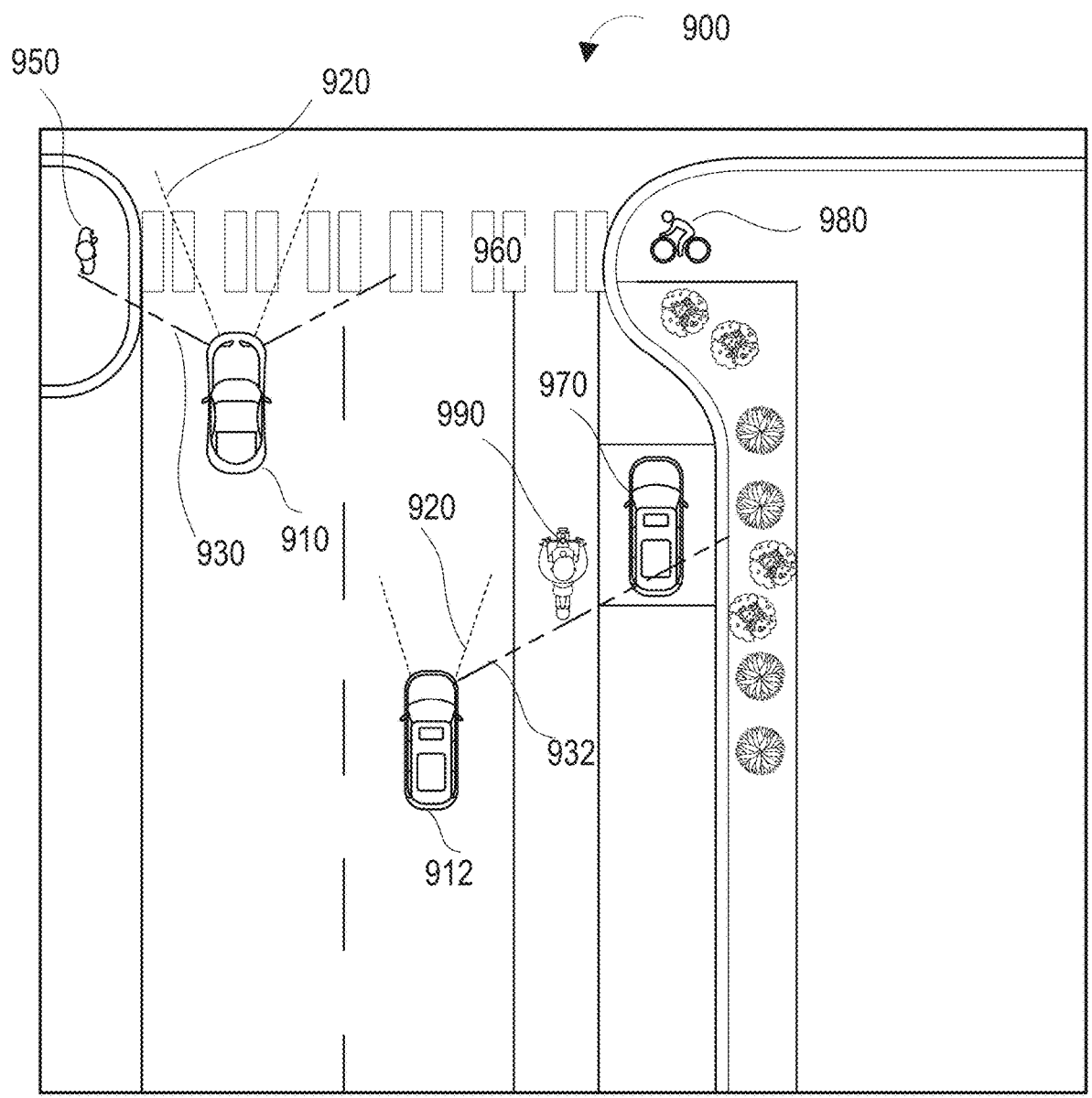
FIG. 9 illustrates vehicles in the context of one or more adjustment objects according to an exemplary embodiment.

FIG. 9 provides another example of the advantages of the predeterminate lighting features described. The urban context shown in scenario 900, depicts two host vehicles 910 and 912 equipped with the systems presently described. Here, the system of vehicles 910, based on vehicle route data, imaging data or both predetermines the presence of a pedestrian 950 or bicyclist 980 (adjustment objects) preparing to enter the cross walk 960. In anticipation thereof, the system switches from a normal or narrow beam mode 920 to a wide beam mode 930 to assist in identifying the presence of said pedestrian. This is particularly beneficial for crosswalks that are not managed by crosswalk lights. Similarly, for host vehicle 912, the presence of parked vehicles 970 and bikes 990 are predetermined based on vehicle route data, imaging data or both such that the beam mode is adjusted prior to the host driver's observance of these adjustment objects. In particular, the host vehicle may change the beam mode of one of the lighting units as shown. That is, the beam mode is adjusted to a wide beam 932 for the right lighting unit as a consequence of predetermining the presence of the bicyclist 980, or parked vehicles 970. Moreover, the beam mode may be adjusted to assist the LiDAR or camera of the host vehicle. At night time or under reduced lighting conditions the imaging devices may perform sub-optimally and not properly scan and identify features along the host vehicle's route. Moreover, the shape of the road, position of surrounding objects or other barriers to detection system or computer vision may, require modification of the beam mode. Further, the inherent uncertainty of the system's detection, is yet another factor which may exacerbate the performance issues of the detectors. Accordingly, in such instances, the beam mode may be adjusted for intensity and/or directionality to improve performance of the detection devices. For example, as further illustrated in the figures of the present disclosure, the high beam, wide beam or both may be employed to both improve driver and detector device vision.

Figure 11:
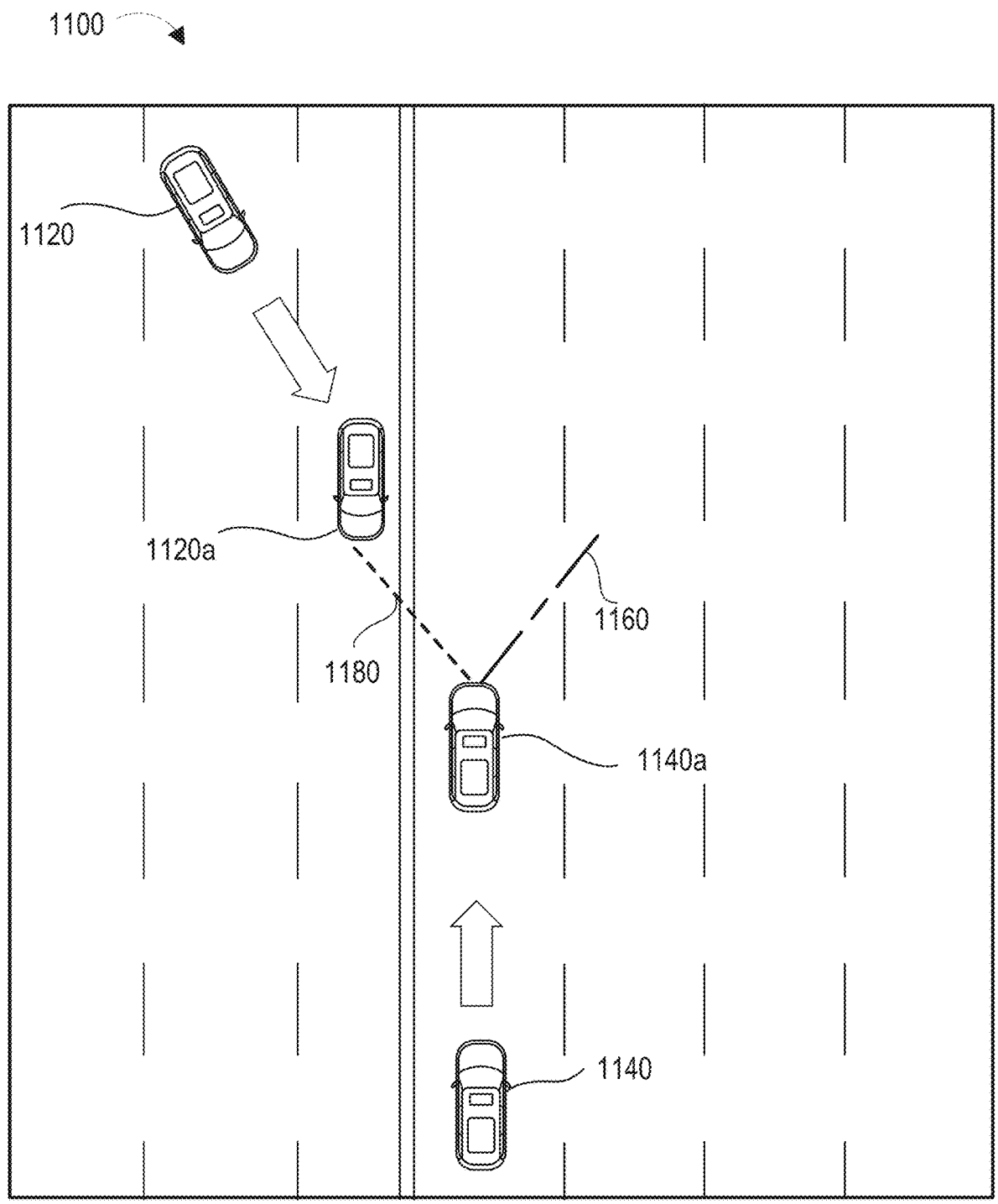
FIG. 11 illustrates predetermination of the position of a host vehicle relative to an adjustment object according to an exemplary embodiment.

The system of an exemplary embodiment is illustrated in FIG. 11. In this scenario 1100, the host vehicle 1140 obtains the location of the other vehicle 1120 using the equipped imaging device, data communication device and/or both. The system then seeks information indicating the other vehicle's 1120 route. In some instances, the other vehicle 1120 may be autonomous and capable of directly and wirelessly communicating its route to the host vehicle 1140. Additionally, or alternatively, the host vehicle 1140 may send a signal directly to the other vehicle to establish a communication link to communicate predicted route information to and from the high definition map route of both vehicles. The predicted route information may include determining on a high definition map the street/lane of the host and other vehicles and predicting whether the other vehicle will be coming in the direction of the host vehicle. In other situations, traffic or roadway conditions may indicate the expected route of the vehicles. This can include road closures, objects on the road, stalled vehicles, accidents or presence of an open lane such as a carpool lane (when a passenger is detected in the other vehicle). Moreover, the motion vector of other vehicles based on speed, direction and other factors may be calculated to predict future position of another vehicle. In one particular example, the vehicle turn signal may be reliable data, at least partially, for inferring direction of the other vehicle 1120. Based on such information, the host vehicle 1140 may predetermine a future location of the host vehicle 1140a and that of the other vehicle 1120a at a certain time. Accordingly, if at the predetermined relative location of the vehicles, beam adjustment is warranted, the system will modify the beam mode of one or more of the host vehicle's light sources.

The adjustment may be further based on the topography of the road (shapes, uphill, downhill or curve) as well as the size and shape of the other vehicle, among other things. For instance, if both vehicles are approaching the top of a hill or a curve in the road, the high beam of the host vehicle may or may not affect the oncoming driver as it would on a straight flat road. As such, the system in the exemplary embodiments may consider the incline, decline and curvature (uphill, downhill or curve) of the road when determining the relative positioning of the vehicles as well as road features, among other things.

Moreover, the beam mode may be partially or completely adjusted based on the shape and size of the other vehicles as needed. That is, the host vehicle head light (or other lighting unit) high beam may be modified to a low beam or partial high beam if possible. Vehicles equipped with more sophisticated lighting units will have a larger variety of modes available so that only a certain vertical distance is illuminated with the high beams. For instance, with larger vehicles such as trucks and SUV's little or no adjustment may be required given higher seating position of the other driver. In such instances, the system may only modify the high beam (rather than completely change to low beam) such that only a certain height is illuminated when the vehicles are in near proximity. In contrast, smaller vehicles such as compacts, or motorcycles may require a different adjustment than larger vehicles. In various embodiments, the system detects the height of the object (truck, small car, pedestrian) and use some level of high beam without blinding the passenger of the other vehicle or pedestrian even when the object is present.

Weather conditions may also be factored when modifying the beam mode. For instance, snow, heavy rain and fog may reflect the high beams. As this may cause a risk to the host vehicle, the high beam mode may be further modifies based on the weather. Such information may be obtained using the vehicle imaging or data communication device of the system such that it is factored in the system predetermination for all or part of the route.

In the example shown in FIG. 11, where the road is flat and linear, the system predetermines that the other vehicle 1120 will change one lane to the left (for example based on the blinking left signal) thereby placing it in the path of the high beam 1160. Accordingly, the high beam 116 is modified to a low beam 1180 only on the left side while the right high beam continues to illuminate the road in front of the host vehicle 1140.

Figure 12:
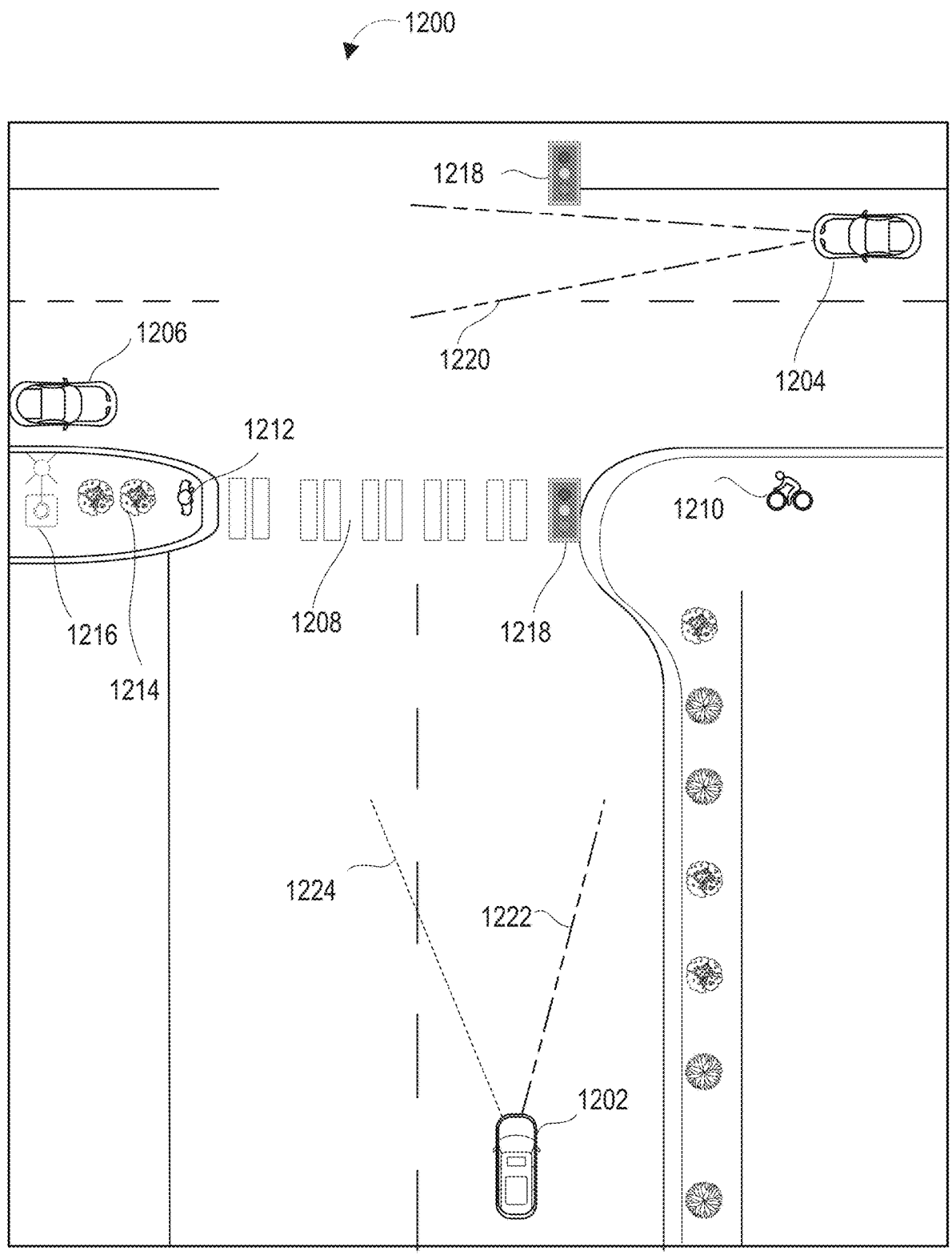
FIG. 12 illustrates a host vehicle in the context of a plurality of adjustment objects.

The present disclosure contemplates still further complex urban scenarios such as that shown in FIG. 12. Here a host vehicle 1202 is shown approaching an intersection. Based on high definition map data, sensor data, GPS data as well as direct data transmission with another vehicles/objects, the host vehicle detects various adjustment objects such as vehicles 1204/1206, bicyclists 1210 pedestrians 1212, shrubs 1214, street lights 1216, the cross walk 1208 and traffic lights 1218. For instance, the host vehicle 1202 may determine that based on the location data, blinking left turn signal and high beams 1220 (as well as other data) of the other vehicle 1204, that it may make a left turn into to opposing lane and thereby be affected by the host vehicle's high beam 1222. Furthermore, the host vehicle 1202 system may determine that the based on the traffic lights 1218 and likelihood of the pedestrian 1212 and/or bicyclist 1210 entering the crosswalk 1208 the other vehicle 1204 may still come within proximity of the host vehicle 1202 and still require adjustment of the beam mode from high 1222 to low 1224.

Figure 3:
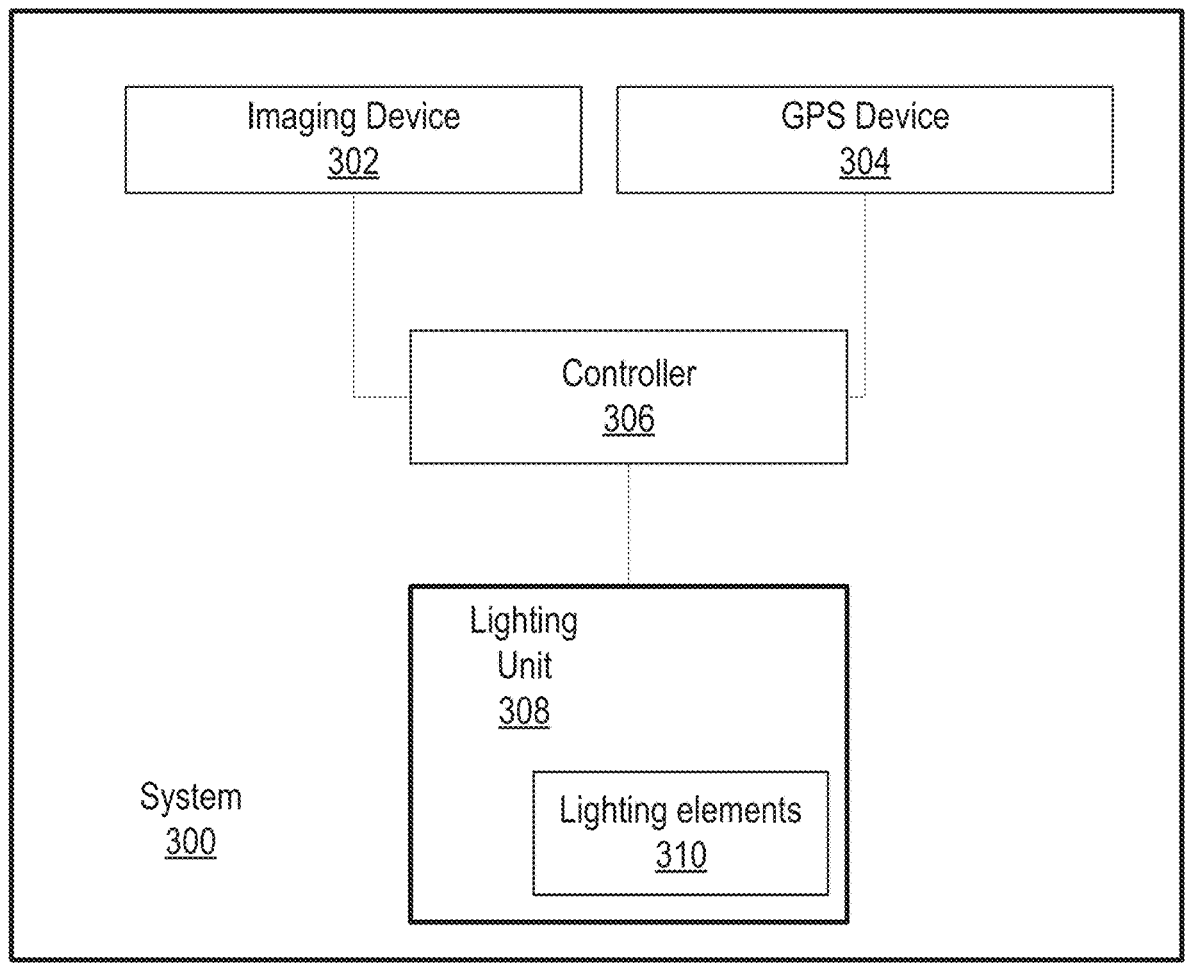
FIG. 3 is a schematic diagram illustrating features of a lighting system according to an exemplary embodiment.
Figure 4:
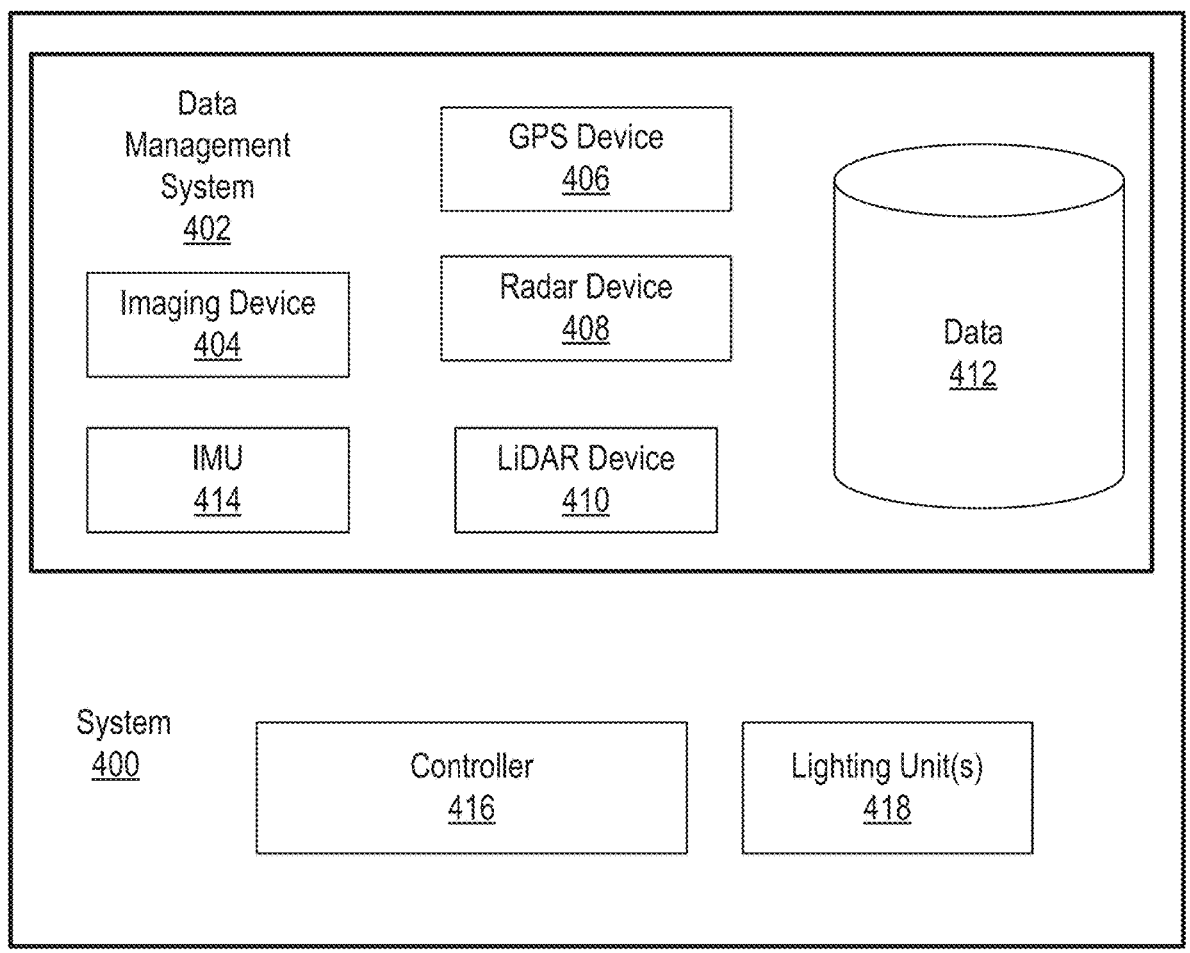
FIG. 4 is another schematic diagram illustrating features of a lighting system according to an exemplary embodiment.

In this scenario, the system also detects another vehicle 1206 which is hidden behind the shrubs 1214. Here, the street lamp 1216 may provide information about vehicles and their direction. For example, host vehicle 1202 receives information about vehicle 1206 which may make a right turn placing itself in the path of the high beam of the host vehicle 1202. Here too, the system may additionally rely on information based on the pedestrian 1212, bicyclist 1210 as well as the crosswalk or traffic light 1218 signal. Based on the location and route data the host vehicle may then modify one or more of the headlight beams from high beam to low beam or low beam to high beam. Systems methods and devices of the exemplary embodiments are further illustrated in FIGS. 3-7. For instance, FIG. 3, provides a simplified schematic diagram showing the system 300 where the system controller 306 relies on data from an imaging device 302 and a GNSS device 304 to predetermine the presence of an adjustment object and manages one or more lighting units 308. The lighting unit 308 comprises lighting elements 310 enabling a wide range of beam modes. As explained earlier, the system may draw on many data sources. As shown for example in FIG. 4, the system 400 can comprise a data management subsystem 402 which is configured to receive and store data 412 from an imaging device 404, an inertial measurement unit (IMU) 414, a GNSS device 406, a radar device 408 and a LiDAR device 410. The system controller 416 based on the adjustment object algorithm and available data determines the beam setting for the lighting unit(s) 418.

Figure 5:
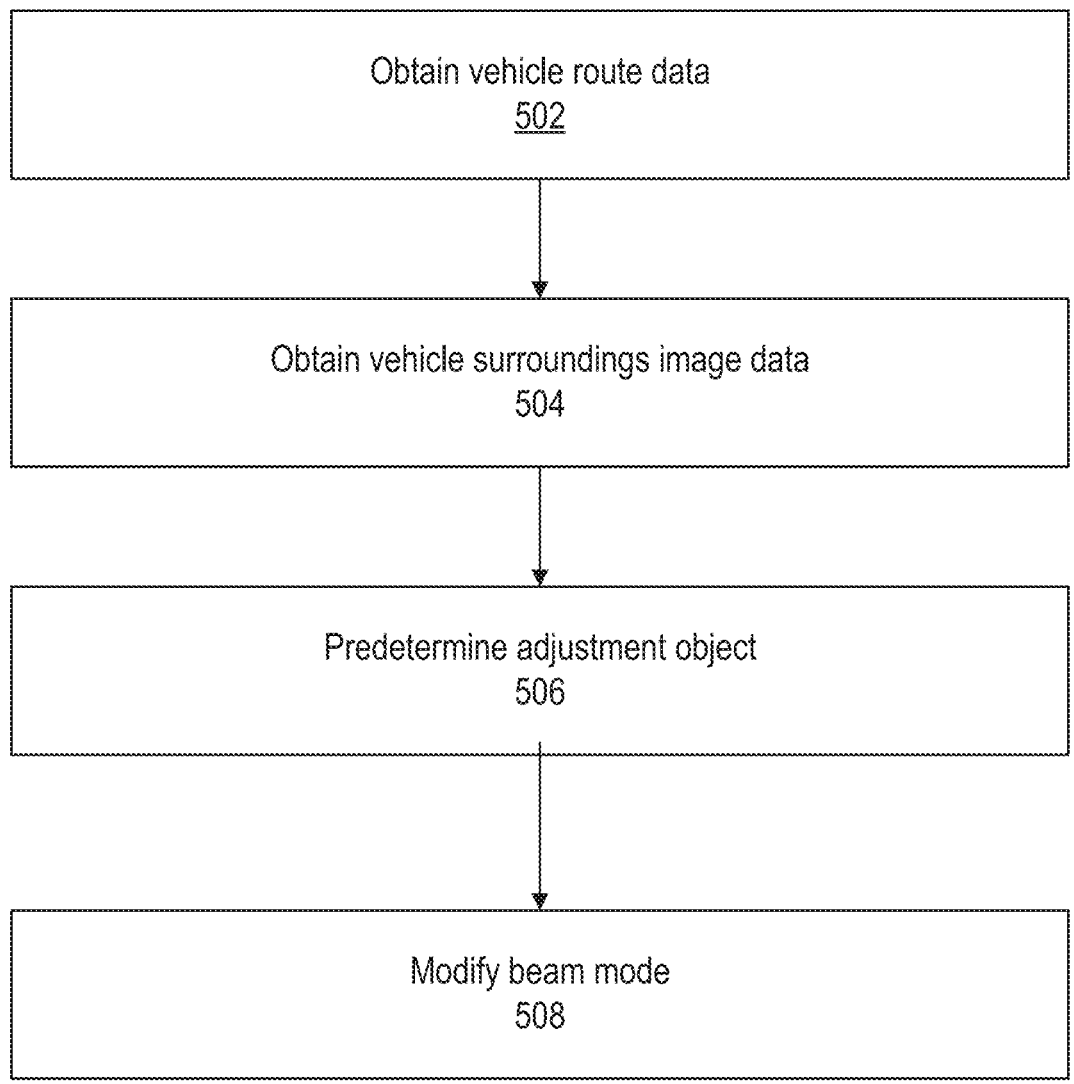
FIG. 5 is a flow diagram showing the steps of modifying a beam mode according to an exemplary embodiment.
Figure 6:
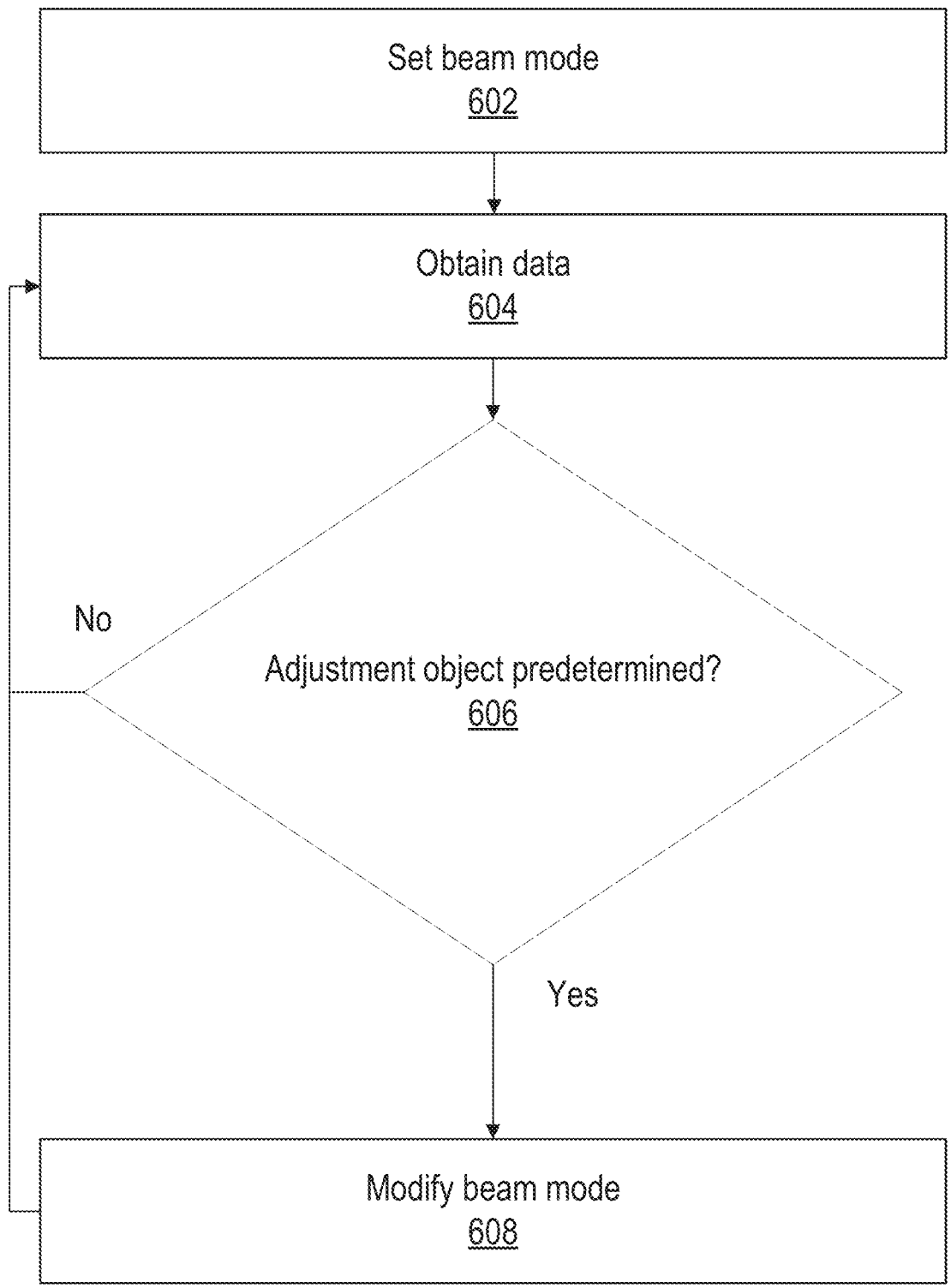
FIG. 6 is another flow diagram showing the steps of modifying a beam mode according to an exemplary embodiment.
Figure 7:
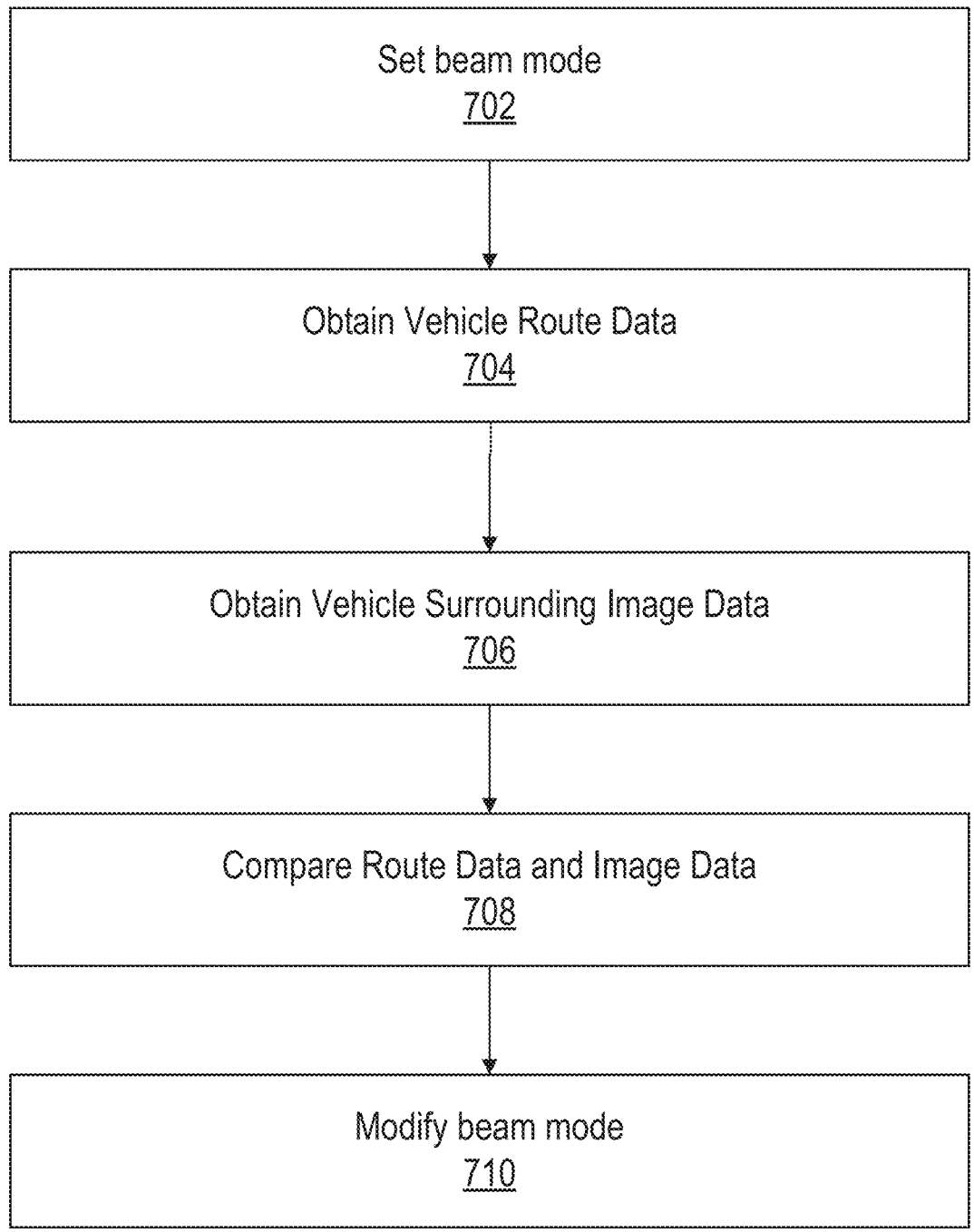
FIG. 7 is another flow diagram showing the steps of modifying a beam mode according to an exemplary embodiment.

In the exemplary embodiments the system may obtain data during the host vehicle trip, before, or both. The flow diagram of FIG. 5 illustrates one such example where the system obtains vehicle route data 502 either during or before the setting out on the route. This may be for instance types of data that is unlikely to require constant updates, such as a map or fixtures including buildings and street lights. The surroundings image data 504 may be collected during the trip to confirm the route data 502 or to supplement the same. Based on the data 502/504 the system predetermines the presence of an adjustment object at step 506. In an exemplary embodiment, this comprises the probability of the adjustment object appearing a certain distance from the vehicle within a certain time interval. Based on the predetermination results or probability, the system may modify the beam mode, at step 508, in a variety of ways such as from a default mode to an adjusted mode, or from a driver preferred mode to an adjusted mode. Of course, the system data may also be used to revert back to the initial beam mode after the adjustment object has passed.

The systems of the exemplary embodiments are configured to continuously receive data and predetermine the presence of adjustment objects. This attribute is illustrated in the flow diagram of FIG. 6, which starts with setting a beam mode 602. The may be a default mode set by the system or selected by the driver. The available modes are also dependent on types of lighting units installed but typically comprise high beam, low beam, wide beam and narrow beam modes. After the system obtain data 604 from the vehicle route data device, the vehicle surroundings imaging device, or other such similar devices as described herein, it moves to predetermining the presence of adjustment object 606. If an adjustment object is predetermined the system modifies one or more lighting units to an adjusted beam mode 608. If no adjustment object is predetermined the system may continue to obtain data. Of course, in certain instances, the system may rely upon on already stored data rather that newly acquired data.

The order of data collection, storage and execution of predetermination algorithm may vary. In the exemplary embodiment shown in FIG. 7, the beam mode is first set prior to obtaining vehicle route data 704. Next, the vehicle surroundings image data is obtained 706 and subsequently compared with the vehicle route data 704. Here the data comparison 708 may be used to confirm the vehicle route data or provide supplementary data upon which the system relies to predetermine the presence of an adjustment object. As before, the beam mode may be modified, at step 710, based on the available and appropriate modes.

The exemplary embodiments further contemplate a non-transitory computer readable medium comprising instructions that, when executed, cause one or more processors to perform steps provided in the present disclosure including (a) setting at least one lighting unit at a driver preferred beam mode, (b) obtaining vehicle route data, (c) obtaining vehicle surroundings image data, (d) predetermining occurrence of an adjustment object based on route data and imaging data, and (e) modifying the at least one lighting unit setting to an adjusted beam mode.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
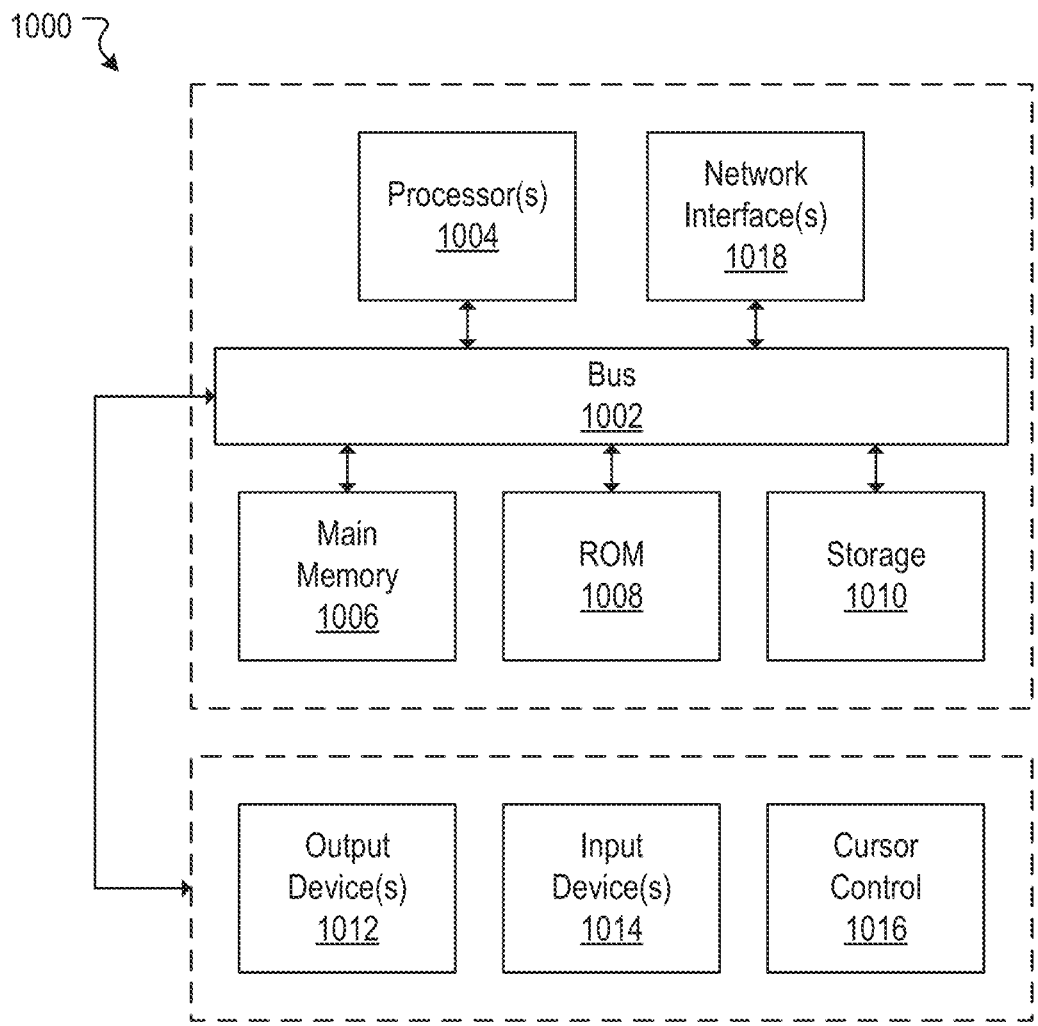
FIG. 10 is a schematic diagram illustrating a computer system according to an exemplary embodiment.

FIG. 10 is a block diagram that illustrates a computer system 1000 upon which any of the embodiments described herein may be implemented. The computer system 1000 includes a bus 1002 or other communication mechanism for communicating information, one or more hardware processor 1004 coupled with bus 1002 for processing information. Hardware processor 1004 or processors may be, for example, one or more general purpose microprocessors.

The computer system 1000 also includes a main memory 1006, such as a random-access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor

1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen lacking a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated service digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for operating vehicle lights on a vehicle comprising:
    a sensor configured to capture image data of a surrounding of the vehicle;
    one or more processors configured to:
        obtain vehicle route data of the vehicle on a map that includes lanes;
        detect a presence of an oncoming vehicle;
        receive vehicle route data of the oncoming vehicle;
        predict a future location of the oncoming vehicle based on the image data, the vehicle route data of the vehicle, the vehicle route data from the oncoming vehicle, the map, and a turn signal of the oncoming vehicle,
            wherein the prediction includes determining the oncoming vehicle will be merging or turning into an oncoming lane immediately adjacent to that of the vehicle; and
        set a beam mode of a portion of lights in the vehicle that is directed at the oncoming lane immediately adjacent to that of the vehicle to a low beam mode while maintaining the remaining lights of the vehicle at a high beam mode based on the predicted future location of the oncoming vehicle.

2. The system of claim 1, wherein the sensor comprises a LiDAR, a radar or a camera.

3. The system of claim 1, wherein the one or more processors are configured to determine a street on which the oncoming vehicle will be located at a future time using the map based on a speed of the oncoming vehicle.

4. The system of claim 1, further comprising a satellite signal receiver.

5. The system of claim 1, wherein the detecting the presence of the oncoming vehicle is via a GNSS (Global Navigation Satellite System) communication element.

6. The system of claim 1, wherein the predicting the future location of the oncoming vehicle comprises a probability of the oncoming vehicle appearing a certain distance from the vehicle within a certain time interval.

7. The system of claim 1, wherein the detecting the presence of an oncoming vehicle is via street lighting that is configured to provide information about other moving objects to the vehicle.

8. A method of operating vehicle lights on a vehicle comprising:
    obtaining vehicle route data of the vehicle on a map that includes lanes;
    obtaining image data of a surrounding of the vehicle;
    detecting a presence of an oncoming vehicle;
    receiving vehicle route data of the oncoming vehicle;
    predicting a future location of the oncoming vehicle based on the image data, the vehicle route data of the vehicle, the vehicle route data from the oncoming vehicle, the map, and a turn signal of the oncoming vehicle,
        wherein the prediction includes determining the oncoming vehicle will be merging or turning into an oncoming lane immediately adjacent to that of the vehicle; and
    setting a beam mode of a portion of lights in the vehicle that is directed at the oncoming lane immediately adjacent to that of the vehicle to a low beam mode while maintaining the remaining lights of the vehicle at a high beam mode based on the predicted future location of the oncoming vehicle.

9. The method of claim 8, wherein the detecting the presence of the oncoming vehicle is via GNSS data.

10. The method of claim 8, wherein the predicting the future location of the oncoming vehicle is based on probability of the oncoming vehicle appearing a certain distance from the vehicle within a certain time interval.

11. A non-transitory computer readable medium comprising instructions that, when executed, cause one or more processors to perform operation of vehicle lights on a vehicle comprising:
    obtaining vehicle route data of the vehicle on a map that includes lanes;
    obtaining image data of a surrounding of the vehicle;
    detecting a presence of an oncoming vehicle;
    receiving vehicle route data of the oncoming vehicle;
    predicting a future location of the oncoming vehicle based on the image data, the vehicle route data of the vehicle, the vehicle route data from the oncoming vehicle, the map, and a turn signal of the oncoming vehicle,
        wherein the prediction includes determining the oncoming vehicle will be merging or turning into an oncoming lane immediately adjacent to that of the vehicle; and
    setting a beam mode of a portion of lights in the vehicle that is directed at the oncoming lane immediately adjacent to that of the vehicle to a low beam mode while maintaining the remaining lights of the vehicle at a high beam mode based on the predicted future location of the oncoming vehicle.

* * * * *